No. 690,612. Patented Jan. 7, 1902.
F. ROBBIN.
HOT WATER HEATER.
(Application filed Aug. 13, 1901.)
(No Model.)
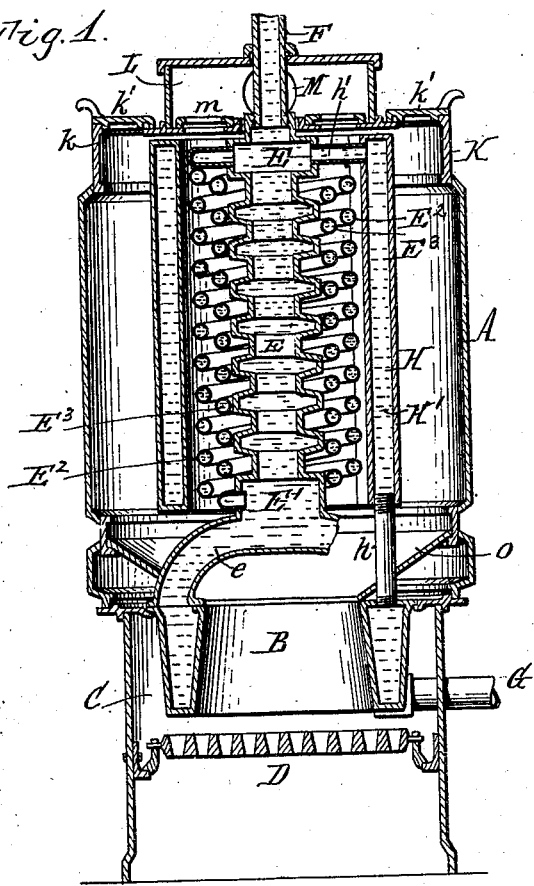
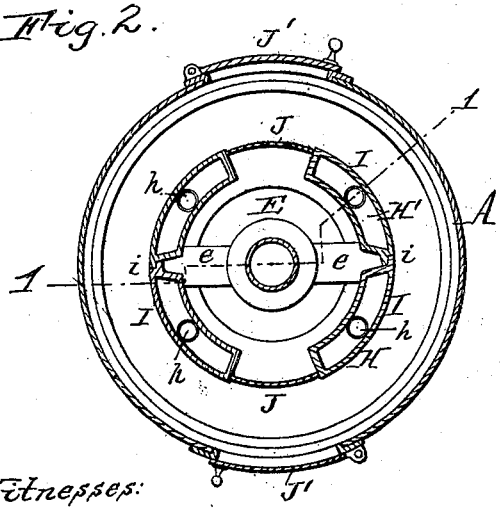
Witnesses:
E. A. Volk
F. F. Scherzinger
Fredrick Robbin, Inventor.
By Wilhelm Bonner
Attorneys.

UNITED STATES PATENT OFFICE.

FREDRICK ROBBIN, OF NEW YORK, N. Y.

HOT-WATER HEATER.

SPECIFICATION forming part of Letters Patent No. 690,612, dated January 7, 1902.

Application filed August 13, 1901. Serial No. 71,908. (No model.)

*To all whom it may concern:*

Be it known that I, FREDRICK ROBBIN, a citizen of the United States, residing at the city of New York, in the county and State of New York, have invented new and useful Improvements in Hot-Water Heaters, of which the following is a specification.

My present invention relates more particularly to a hot-water heater of the general character disclosed in the United States Letters Patent issued to me August 16, 1898, No. 609,048. The heater therein described is especially adapted for heating water for hot-water heating systems and comprises, generally speaking, an outer casing or shell, a hollow fire-pot arranged below the same, an inner casing or shell arranged within the outer casing above the fire-pot and constituting the combustion-chamber or passage for the smoke and products of combustion from the fire-pot to the smoke-pipe, said inner casing being spaced from and forming with the outer casing an annular fuel-magazine which surrounds the combustion-chamber and communicates at its lower end with the fire-pot, and a water heating and circulating column located above the fire-pot within the combustion-chamber.

The primary object of the present invention is to increase the water capacity and water-heating surface in such a heater without materially increasing the size of the heater and to so arrange the additional water heating and circulating chamber thus provided that no additional consumption of fuel is necessary to properly heat the water.

Other objects are to prevent the undue heating of the fuel in the fuel-magazine, to minimize the generation of gas therein, and to prevent the burning out of the combustion-chamber casing or wall. To these ends I construct a heater of the character mentioned with a hollow inner casing or wall between the fuel-magazine and combustion-chamber and constituting a water heating and circulating chamber.

In the accompanying drawings, Figure 1 is a vertical sectional view illustrating a hot-water heater embodying the present invention and taken substantially on the line 1 1 of Fig. 2. Fig. 2 is a horizontal sectional view through the heater shown in Fig. 1. Fig. 3 is a top plan view of the hollow inner casing or wall removed. Fig. 4 is a fragmentary vertical sectional view through one of the removable panels of the inner hollow casing. Fig. 5 is an elevation of the parts shown in Fig. 4.

Like letters of reference refer to like parts in the several figures.

Referring to the drawings, A indicates the outer casing or shell; B, the fire-pot, which is preferably hollow and is located below the outer casing and within the ash-box C; D, the grate within the ash-box below the fire-pot, and E the water heating and circulating column. The latter is preferably similar to that shown in my above-mentioned patent and comprises the central upright tube or column E′, connecting at its lower end with the hollow fire-pot by means of water-legs $e$, and the spirally-arranged coils $E^2$ and $E^3$, encircling the column E and connecting therewith at its upper and lower ends.

F indicates the outgoing circulating-pipe, which, as shown, connects with the upper end of the water-column, and G indicates the return-pipe, which is shown as connecting with the hollow fire-pot B.

Above the fire-pot and surrounding the water-column is an inner hollow casing or wall H, which constitutes the combustion-chamber or passage for the smoke and products of combustion and which is arranged concentrically within and spaced from the outer shell or casing, so as to provide between the shells or casing an annular fuel-magazine, which communicates with the fire-pot by means of a space left between the lower end of the inner casing or wall H and the top of the fire-pot. The inner casing or wall being hollow provides a water chamber or space H′, which preferably connects at its lower end, as by means of upright pipes $h$, with the hollow fire-pot, and which also connects with the upper part of the water-column E, as by means of a pipe or pipes $h'$. The pipes $h$ preferably constitute the supporting means for the inner casing or wall. For convenience in manufacturing and assembling the parts the inner casing is preferably made of a plurality of upright segmental sections I, each of which is connected at its bottom to the fire-pot and at its top to the water-column by means of the pipes $h$ and $h'$. As shown in the drawings, the inner casing is composed of four sections arranged in pairs on diametrically opposite sides, the two parts being separated a sufficient distance to afford access to the water-column and the interior of the combustion-chamber for the purpose of cleaning and other purposes. A greater or less number of sections may be employed, as the size of the heater or other considerations may render desirable. The contiguous upright faces of the sections constituting a pair are provided with overlapping upright shoulders or ribs $i$ for forming dust-proof joints. The open spaces between the pairs of sections are closed by movable or detachable panels J, which complete the cylindrical casing. These spaces and panels are arranged opposite the doors J' in the outer shell, so that upon opening such a door and removing the panel behind the same access can be had to the interior of the inner casing. Each panel is conveniently supported by ribs or lugs $j$ on the opposing faces of the sections I and notches $j'$ formed in the edges of the upper inbent portion of the panel. The lugs preferably slope inwardly on their upper sides, whereby the panels are held against accidental outward movement on the same. The notches in the panels are made so high that the panels can be readily lifted from the lugs when desired. While I prefer this sectional construction of the inner hollow casing, my invention is not limited to the same, as this casing can be constructed in various other ways without changing the general operation of the apparatus.

The outer casing or shell is provided with a top or head K, having fuel-filling openings $k$ for the magazine, which are closed by lids $k'$. The head or top is preferably arranged above the top of the inner casing or wall H and supports a smoke box or flue L, which communicates with the smoke-pipe M. The head is provided with openings $m$ above the combustion-chamber, by means of which the latter communicates with the smoke-box and through it with the smoke-pipe M. A damper of any desired character is provided for controlling these openings. The bottom of the fuel-magazine is preferably contracted or hopper-shaped, for which purpose I provide a funnel-shaped or flaring ring O, which more readily directs the fuel into the fire-pot.

The above-described hollow inner casing or wall forms, in effect, a part of the water-column and provides a water space or chamber of considerable capacity in which the water can be heated and circulated upwardly with the water in the column proper. The construction therefore provides considerable heating-surface, and, owing to its shape and location, adds very little to the dimensions of the heater. The water-chamber being located between the combustion-chamber and the fuel-magazine, the water therein prevents to a considerable degree the heating of the fuel in the latter and prevents the burning out of the casing or wall.

While the hollow inner casing or wall is shown as connecting indirectly with the water-column through the medium of the hollow fire-pot, which construction is preferable, it it evident that this is not absolutely essential, as the same could be connected directly with the water-column or return-pipe.

As will be seen from Fig. 1, the inner wall of the hollow fire-pot is preferably in the form of a cone-frustum—that is, it flares outwardly from the top toward the bottom. This formation permits the ashes to drop readily down from the wall, so that the same can always be kept clean and bright.

I claim as my invention—

1. The combination with an outer casing, of a hollow-walled, inner casing separated from the outer casing and constituting a combustion-chamber or passage for the smoke and products of combustion, the space between the casings forming a fuel-magazine above the fire-pot, and a fire-pot arranged beneath the inner casing, substantially as set forth.

2. The combination with an outer casing, of a hollow-walled, inner casing separated from the outer casing and constituting a combustion-chamber or passage for the smoke and products of combustion, the space between the two casings constituting a fuel-magazine above the fire-pot, a fire-pot arranged beneath the inner casing, a water-heating column arranged within the inner casing, and water connections between the hollow-walled casing and the water-column, substantially as set forth.

3. The combination with an outer casing, of a hollow, inner casing separated from the outer casing and constituting a combustion-chamber or passage for the smoke and products of combustion, the space between the casings forming a fuel-magazine above the fire-pot, a hollow fire-pot, and a water connection between the fire-pot and the hollow casing, substantially as set forth.

4. The combination with an outer casing, and a hollow fire-pot, of a hollow inner casing arranged above the fire-pot, pipes connecting the fire-pot and hollow casing, and a water heating and circulating column connecting with the hollow casing and with the hollow fire-pot, substantially as set forth.

5. The combination with an outer casing, of a hollow inner casing separated from the outer casing and constituting a combustion-chamber or passage for the smoke and products of combustion, the space between the two casings constituting a fuel-magazine above the fire-pot, the hollow fire-pot arranged beneath the inner casing, a water-heating column arranged within the inner casing, and water connections between the upper part of the casing and the water-column and between the lower part of the casing and the fire-pot, substantially as set forth.

6. The combination with an outer shell or casing and a fire-pot, of an inner concentric casing composed of segmental sections, which are hollow and provide water-spaces, said inner casing being separated from the outer shell and constituting a combustion-chamber or passage for the smoke and products of combustion and the space between the two casings forming a fuel-magazine above the fire-pot, substantially as set forth.

7. The combination with an outer shell or casing and a fire-pot, of an inner concentric casing composed of hollow, segmental sections having their contiguous upright faces provided with overlapping shoulders, said inner casing being separated from the outer shell and constituting a combustion-chamber or passage for the smoke and products of combustion, and the space between the two casings forming a fuel-magazine above the fire-pot, substantially as set forth.

8. The combination of an outer casing or shell, a fire-pot, a water-column above said fire-pot, a hollow inner casing arranged between the water-column and the outer casing or shell and provided with an upright opening through which access can be had to the water-column, and a movable panel closing said opening, substantially as set forth.

9. The combination of an outer casing or shell, a fire-pot, a water-column above said fire-pot, a hollow inner casing arranged between the water-column and the outer casing or shell and provided with an upright opening through which access can be had to the water-column, supporting-lugs arranged on both sides of said opening, and a removable panel provided in its sides with notches which engage said lugs, substantially as set forth.

Witness my hand this 8th day of August, 1901.

FREDRICK ROBBIN.

Witnesses:
 EDWARD WILHELM,
 CLAUDIA M. BENTLEY.